US011863879B2

(12) United States Patent
Siess et al.

(10) Patent No.: US 11,863,879 B2
(45) Date of Patent: Jan. 2, 2024

(54) SYSTEMS FOR CHARACTERIZING AMBIENT ILLUMINATION

(71) Applicant: ams Sensors Germany GmbH, Jena (DE)

(72) Inventors: Gunter Siess, Kraftsdorf (DE); Julius Komma, Jena (DE)

(73) Assignee: ams Sensors Germany GmbH, Jena (DE)

(*) Notice: Subject to any disclaimer, the term of this patent is extended or adjusted under 35 U.S.C. 154(b) by 64 days.

(21) Appl. No.: 17/621,774

(22) PCT Filed: Aug. 26, 2020

(86) PCT No.: PCT/EP2020/073891
§ 371 (c)(1),
(2) Date: Dec. 22, 2021

(87) PCT Pub. No.: WO2021/037934
PCT Pub. Date: Mar. 4, 2021

(65) Prior Publication Data
US 2022/0360756 A1   Nov. 10, 2022

Related U.S. Application Data

(60) Provisional application No. 62/892,793, filed on Aug. 28, 2019.

(30) Foreign Application Priority Data

Jul. 20, 2020 (GB) .................................. 2011144

(51) Int. Cl.
*H04N 23/88* (2023.01)
*G01J 3/50* (2006.01)
(Continued)

(52) U.S. Cl.
CPC .............. *H04N 23/88* (2023.01); *G01J 3/505* (2013.01); *H04N 9/67* (2013.01); *H04N 9/77* (2013.01);
(Continued)

(58) Field of Classification Search
CPC ............ H04N 23/88; H04N 9/67; H04N 9/77; H04N 23/56; H04N 23/71; H04N 23/74; H04N 2209/047; H04N 23/54; G01J 3/505
See application file for complete search history.

(56) References Cited

U.S. PATENT DOCUMENTS 10,267,677 B1    4/2019   Sarkar et al.
2003/0058447 A1*  3/2003   Yamada ................. G01J 3/513
                                                                                356/402
(Continued)

FOREIGN PATENT DOCUMENTS

| CN | 105574525 A | 5/2016 |
| EP | 1615169 A2 | 1/2006 |
| EP | 1662806 A1 | 5/2006 |

OTHER PUBLICATIONS

International Search Report for corresponding International Application No. PCT/EP2020/073891, dated Oct. 30, 2020.
(Continued)

*Primary Examiner* — Abdelaaziz Tissire
(74) *Attorney, Agent, or Firm* — Michael Best & Friedrich LLP

(57) ABSTRACT

A camera system with a multispectral sensor that can be used in combination with a flash to determine a spectrum of the ambient illumination without needing a separate measurement. This may then be used to colour-correct an image captured with or without flash.

17 Claims, 8 Drawing Sheets

(51) Int. Cl.
  *H04N 9/67* (2023.01)
  *H04N 9/77* (2006.01)
  *H04N 23/56* (2023.01)
  *H04N 23/71* (2023.01)
  *H04N 23/74* (2023.01)

(52) U.S. Cl.
  CPC ............ *H04N 23/56* (2023.01); *H04N 23/71* (2023.01); *H04N 23/74* (2023.01)

(56) References Cited

U.S. PATENT DOCUMENTS

| | | | |
|---|---|---|---|
| 2007/0025717 A1* | 2/2007 | Raskar | G06T 5/50 348/E5.038 |
| 2008/0266554 A1* | 10/2008 | Sekine | G01J 1/4204 356/300 |
| 2019/0114469 A1* | 4/2019 | Sartor | G06V 10/141 |
| 2019/0301932 A1* | 10/2019 | Sarkar | G01J 3/465 |
| 2022/0412798 A1* | 12/2022 | Siess | G01J 3/463 |

OTHER PUBLICATIONS

Korean Patent Office Action for Application No. 10-2022-7009302 dated Jun. 21, 2023 (11 pages, English translation included).
Chinese Patent Office Action for Application No. 202080056094.8 dated Apr. 17, 2023 (16 pages).

\* cited by examiner

SYSTEMS FOR CHARACTERIZING AMBIENT ILLUMINATION

FIELD

This specification relates to characterizing ambient illumination.

BACKGROUND

The appearance of an image captured by a camera is affected by the ambient illumination. For example a white object will be seen by a camera as red in red light, although human colour perception exhibits colour constancy.

Knowledge of the spectrum of the ambient illumination would enable colour modification based on the illumination. This might, but need not, involve colour-correction such as white balancing. Knowledge of the spectrum of the ambient illumination could also support other types of image post-processing.

It is desirable to be able to correct a camera for the effect of coloured ambient illumination on an image but this is difficult because the problem is under-constrained. One approach is to assume that the colour spectrum averages to grey over an imaged scene ("grey world"); another is to assume that a brightest pixel is white and hence captures a spectrum of the ambient illumination. However both these fail for some scenes. A spectrometer could be used to directly measure a spectrum of the source of ambient illumination, but this is impractical. A user could be asked to manually select a type of ambient illumination, but this is cumbersome.

SUMMARY

This specification generally relates to systems, e.g. camera systems, for characterizing ambient illumination, for example for colour correction of images captured by the camera. In implementations a spectrum of the ambient light is reconstructed using a multispectral sensor and a camera flash unit.

In one aspect there is described a method of using a camera system to characterize ambient illumination. The camera system may include an image sensor to capture a view of a scene, an illuminator, e.g. a camera flash unit, to provide illumination of the scene, and a multispectral sensor to capture a spectrum of light from the scene in a plurality of wavelength channels. The illuminator and multispectral sensor may be part of a camera or associated with the camera. The camera system may, e.g. be part of a smartphone.

The method may comprise capturing a first spectrum of light from the scene using the multispectral sensor whilst the flash is operating to illuminate the scene in addition to ambient illumination. The method may further comprise capturing a second spectrum of light from the scene using the multispectral sensor whilst the flash is not operating and the scene is illuminated by the ambient illumination. The order of capturing the first and second spectra is irrelevant.

The method may further comprise determining a difference between the first and second spectra representing a scene flash spectrum. The scene flash spectrum may represent a spectrum of the scene when illuminated by the flash without the ambient illumination. The method may further comprise compensating the scene flash spectrum using a spectrum of the flash illumination to determine a colour-compensated scene flash spectrum. The colour-compensated scene flash spectrum may represent an average reflectance spectrum of the scene when compensated for the spectrum of the flash illumination. For example colour-compensated scene flash spectrum may represent a "true" average colour of image pixels under white light.

The method may further comprise processing the second spectrum of light from the scene using the colour-compensated scene flash spectrum to estimate a spectrum of the ambient illumination. The spectrum of the ambient illumination may be defined by ambient illumination data defining a light level of the ambient illumination e.g. an illuminance or radiance, at a plurality of different wavelength data points.

Approximately, the light level seen by the multispectral sensor at a wavelength may be defined by a product of the illumination level at that wavelength and the scene reflectance at that wavelength. Thus in some implementations processing the second spectrum of light from the scene using the colour-compensated scene flash spectrum may comprise dividing each of a set of values representing the second spectrum of light at each of a respective set of wavelength points by a corresponding value for the colour-compensated scene flash spectrum at the respective wavelength point.

In some implementations processing the second spectrum of light from the scene using the colour-compensated scene flash spectrum to estimate a spectrum of the ambient illumination comprises dividing a representation of the second spectrum of light by the colour-compensated scene flash spectrum.

In some implementations the method may further comprise compensating each of the first and second spectra for a response of the multispectral sensor.

In some implementations the multispectral senor has n wavelength channels. The first and second spectra may be represented by respective first spectrum and second spectrum vectors of length n (later $D_{TFA}$; $D_{TA}$). Determining the difference between the first and second spectra may comprise subtracting one of the first spectrum and second spectrum vectors from the other to determine a scene flash spectrum vector (later, $D_{TF}$).

In some implementations, though not essentially, the spectrum of the flash illumination is represented by a flash illumination vector (later, $E(\lambda)$) of length m, where m represents a number of (discrete) wavelength points defined by the spectrum. A sensitivity of the multispectral sensor at the wavelength points for each wavelength channel may be defined by a n×m sensitivity matrix (later, $S(\lambda)$). Compensating the scene flash spectrum using the spectrum of the flash illumination may comprise multiplying the scene flash spectrum vector by a (n×m) matrix (later, $M_{TF}$) defined by a combination of the sensitivity matrix and the flash illumination vector to obtain a colour-compensated scene flash spectrum vector (later, $R_T(\lambda)$) representing the colour-compensated scene flash spectrum. The matrix may be determined by determining an inverse of a product of the sensitivity matrix and the flash illumination vector, or it may be determined another way e.g. by a calibration process.

In some implementations the method may further comprise multiplying the second spectrum vector by an inverse of the sensitivity matrix to obtain a sensor-compensated second spectrum vector (later, $R_{TA}(\lambda)$). The method may then further comprise dividing sensor-compensated second spectrum vector by the colour-compensated scene flash spectrum vector.

In some implementations claim the multispectral sensor has at least four wavelength channels. For example the multispectral sensor may have >6 e.g. 6-8 wavelength channels. The multispectral sensor may be a non-imaging sensor.

The method may further comprise adapting an RGB (Red Green Blue) to CIE (Commission Internationale de l'Éclairage) XYZ transformation matrix of the camera using the estimated spectrum of the ambient illumination. For example values of the elements of the standard (3×3) transformation matrix from e.g. sRGB to CIE-XYZ may be modified to compensate for a colour of the ambient illumination e.g. for colour correction such as white balancing.

In some applications the method may include using the image sensor to capture an image. For example the image may be captured at the same time as either the first or second spectrum (a spectrum of the illumination is known at both these times because the spectrum of the flash illumination is known). The estimated spectrum of the ambient illumination may then be used to colour-correct the image e.g. contemporaneously with the image capture.

Also or instead the method may include storing data representing the estimated spectrum of the ambient illumination with image data representing the captured image e.g. for later use in colour correction. For example it may be useful to have available an uncorrected image and data (the estimated spectrum of the ambient illumination) which may be used to modify the colours in the image at a later stage e.g. to try out different types or degrees of colour correction. Such post-processing may be performed on the camera system and/or subsequently e.g. on a separate local machine or remote server.

In some implementations the method is used for the camera system of a smartphone or other mobile device. The method may then be implemented using local or remote processors, or shared between local and remote processors.

Also or instead the method may include processing the estimated spectrum of the ambient illumination to classify the predominant ambient illumination into one of a set of discrete categories e.g. one or more of fluorescent light illumination, LED illumination, tungsten/incandescent illumination, daylight illumination and so forth. In some applications there may be only two such categories e.g. to identify whether or not an image has been captured under "difficult" or artificial lighting or under natural lighting or sunlight. This information may be used to control the capture of an image (e.g. exposure time) and/or to control subsequent modification of a captured image.

In implementations, classifying the predominant ambient illumination into one of a set of discrete categories may comprise normalizing the estimated spectrum of the ambient illumination and comparing this to one or more reference spectra, e.g. to determine a distance metric to the or each reference spectrum. The identified class of illumination may be the one with the smallest distance metric to its reference spectrum.

Some implementations of the method may include processing the estimated spectrum of the ambient illumination to determine illumination data characterizing a colour (e.g. in CIE u', v' colour space) or colour temperature (e.g. correlated colour temperature, CCT) of the ambient illumination. The illumination data may then be stored with image data from the image sensor and/or used to colour-correct a captured image.

In another aspect there is described a camera system. The camera system may comprise one or more of: an image sensor to capture a view of a scene, an illuminator e.g. a flash unit to provide flash illumination of the scene, and a multispectral sensor to capture a spectrum of light from the scene in a plurality of wavelength channels. The camera system may also comprise an image processing subsystem.

The image processing subsystem may be configured to capture a first spectrum of light from the scene using the multispectral sensor whilst the flash is operating to illuminate the scene in addition to ambient illumination. The image processing subsystem may be further configured to capture a second spectrum of light from the scene using the multispectral sensor whilst the flash is not operating and the scene is illuminated by the ambient illumination. The image processing subsystem may be further configured to determine a difference between the first and second spectra representing a scene flash spectrum, wherein the scene flash spectrum represents a spectrum of the scene when illuminated by the flash without the ambient illumination. The image processing subsystem may be further configured to compensate the scene flash spectrum using a spectrum of the flash illumination to determine a colour-compensated scene flash spectrum, wherein the colour-compensated scene flash spectrum represents an average reflectance spectrum of the scene when compensated for the spectrum of the flash illumination. The image processing subsystem may be further configured to process the second spectrum of light from the scene using the colour-compensated scene flash spectrum to estimate a spectrum of the ambient illumination.

In some implementations of the above described systems/methods a level of light output from the flash (e.g. irradiance or radiance) may be broadly the same as the level of ambient light (e.g. irradiance or radiance) e.g. to within a factor of 20 (i.e. one should not be more than 20 times larger or smaller than the other).

In another aspect there is provided a method of using a camera system, the method comprising capturing spectra with a sensor, and processing at least a portion of the captured spectra to generate data related to the captured spectra.

In another aspect there is provided a system e.g. a camera system comprising a sensor configured to capture spectra, and a processing system configured to process at least a portion of the captured spectra and to generate data related to the captured spectra.

The camera system may be configured to implement the above described features and aspects by software controlling one or more processors of the system, or by dedicated hardware, e.g. electronic circuitry, which may be on one or more integrated circuits, or e.g. using a combination of software and hardware.

Thus there is also provided (dedicated) hardware, e.g. electronic circuitry, configured to implement a method as described above.

There is further provided processor control code to implement a system and method as described above i.e. processor control code which, when executed by a processor (computer), causes the processor to implement a system or perform a method as described. The code may be provided as a signal transmitted over a network, or on one or more computer readable media e.g. one or more physical data carriers such as a disk or programmed memory such as non-volatile memory (eg Flash) or read-only memory (Firmware). Code and/or data to implement examples of the system/method may comprise source, object or executable code in a conventional programming language, interpreted or compiled), such as C, or assembly code, or code for a hardware description language. The code and/or data to implement the systems may be distributed between a plurality of coupled components in communication with one another.

The above described methods and systems potentially have applications in other electronic devices than cameras, in particular an electronic device without an image sensor such as a projector. In such cases case the image sensor may be omitted and the camera system may be more aptly termed an ambient illumination characterization system.

Details of these and other aspects of the system are set forth below, by way of example only.

BRIEF DESCRIPTION OF THE DRAWINGS

In the drawings like reference numerals indicate like elements.

DETAILED DESCRIPTION

To properly capture or represent a colour under coloured ambient illumination requires knowledge of the ambient light spectrum. For example under reddish ambient illumination a white surface will appear reddish, but so will a reddish surface under white light illumination.

This specification describes a camera system with a multispectral sensor that can be in combination with a flash to determine a spectrum of the ambient illumination without needing a separate measurement. This may then be used to colour-correct an image captured with or without flash, e.g. to perform automatic white balancing. The camera system may form part of a consumer electronic device such as a camera, mobile phone, tablet, laptop, or other device. However variants of the system need not capture an image, e.g. a variant of the system may be used in a projector to project a colour-corrected image.

Figure 1A:
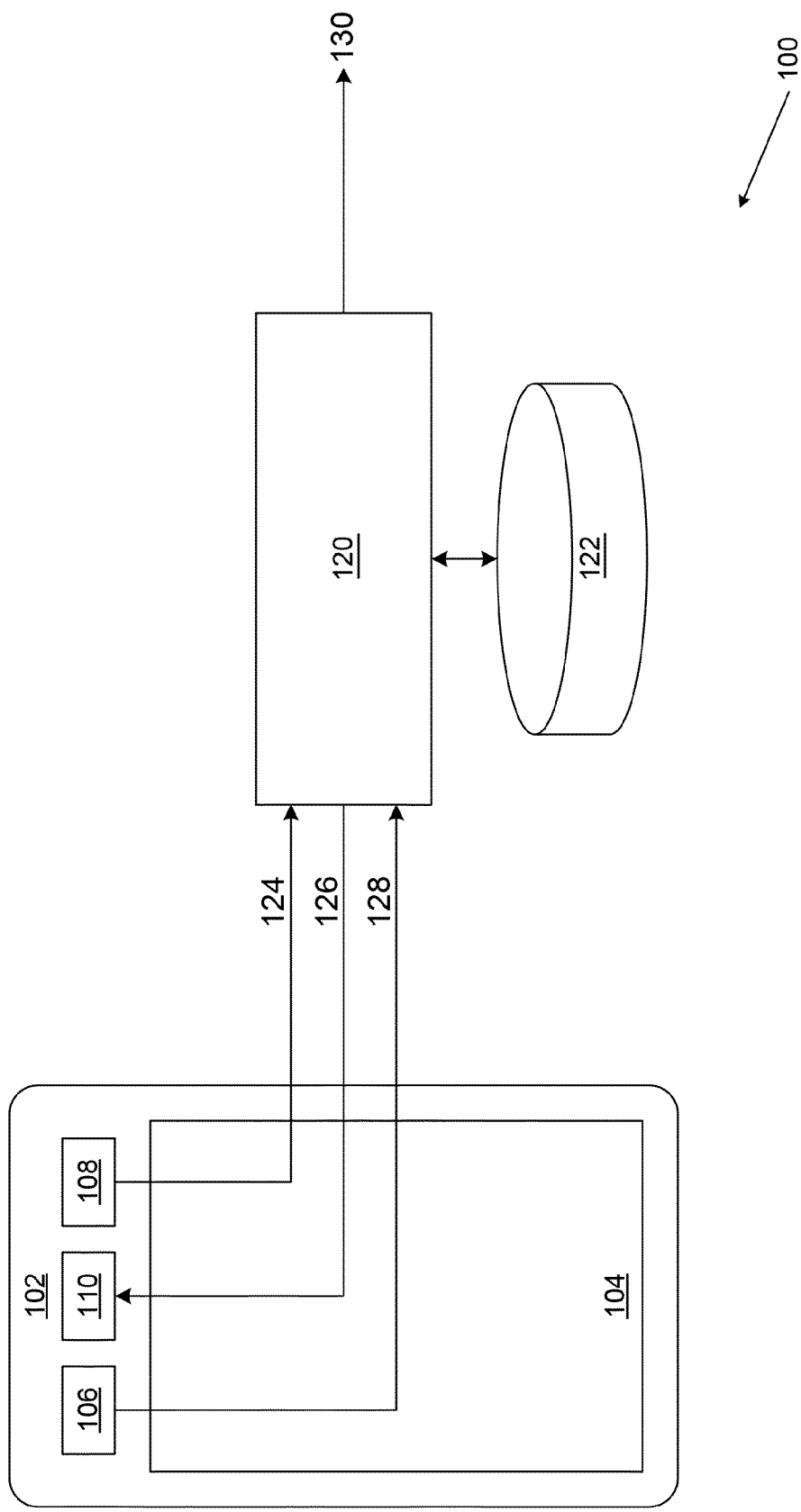
FIGS. 1a and 1b show a camera system for characterizing ambient illumination and the response of a multispectral sensor for the system.

FIG. 1a shows a camera system 100 which, in this example, is part of a mobile device 102 with an optional display 104 (though shown separately for convenience). The camera system 100 includes an image sensor 106 and a multispectral sensor 108. In general but not necessarily these point in similar directions so that the multispectral sensor 108 sees light captured by the image sensor. The multispectral sensor 108 may be provided with a diffuser e.g. to increase its field of view, or an aperture e.g. to restrict its field of view.

In implementations the multispectral sensor 108 comprises an n-channel sensor where n≥4, e.g. n=6-8, defines a number of wavelength channels of the multispectral sensor. In this specification the data captured from the multispectral sensor 108 is referred to as a spectrum, even though in some implementations it may define only four points of the spectrum.

Figure 1B:
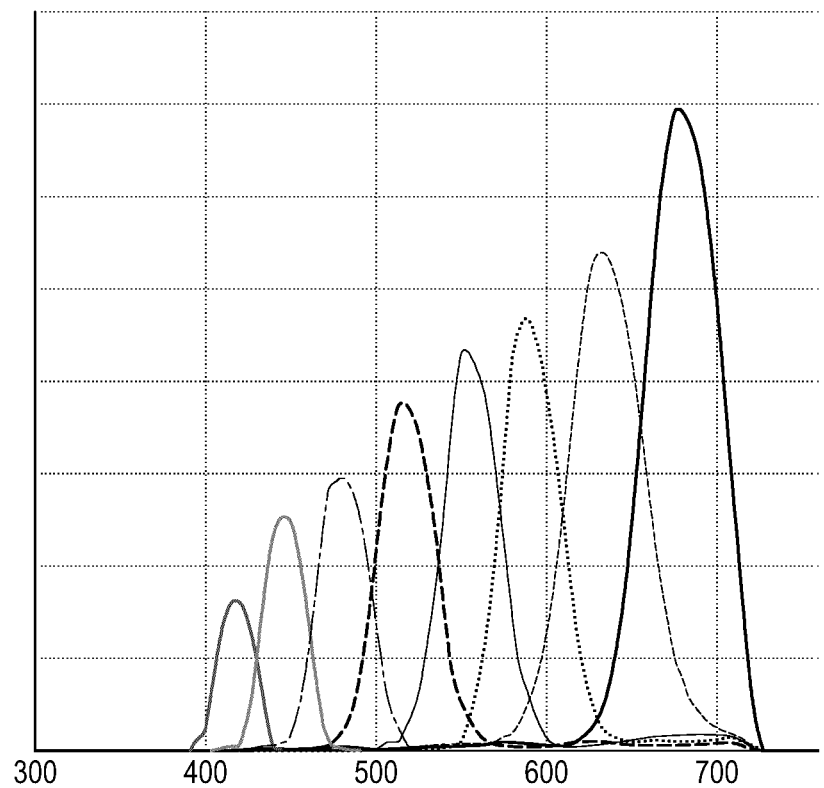

FIG. 1b shows the spectral response of a suitable example multispectral sensor (the ams AS7341) which has 8 optical channels; wavelength in nm is on the x-axis. The multispectral sensor 108 may cover the entire visible wavelength range e.g. from <450 nm to >700 nm e.g. 380 nm-780 nm; in some implementations its sensitivity may extend to the ultraviolet (UV) or near infrared (NIR). The multispectral sensor 108 may be a sensor with optical filters defining the wavelength channels e.g. a silicon photodiode sensor. The filters may be e.g. polymer, plasmonic, and/or interference filters; they may include one or more filters to block UV and/or NIR.

The camera system 100 also includes a flash 110 to illuminate, directly or indirectly, a scene viewed by the multispectral sensor 108. The flash 110 may comprise e.g. one or more LEDs (light emitting diodes).

The field of view (FOV) of the multispectral sensor 108 and the FOV (strictly, the field of illumination) of the flash 110 should overlap, and in implementations are similar. The multispectral sensor 108, flash 110, and image sensor 106 may be physically nearby one another on mobile device 102.

The camera system 100 includes an image processing subsystem 120. In implementations this is configured to control the flash 110, e.g. via line 126, to provide flash illumination of the scene, and to capture data from the multispectral sensor 108, e.g. via line 124, representing a spectrum of light from the scene. The image processing subsystem 120 may also cooperate with the image sensor 106 to capture an image of the scene, e.g. via line 128, and optionally to process the captured image. In implementations the image processing subsystem 120 is integrated with the camera system 100 (though shown separately in FIG. 1).

In implementations the image processing subsystem 120 is configured to control the flash and capture and process data from the multispectral sensor 108 in order to estimate a spectrum of ambient light illuminating the scene. The image processing subsystem 120 has an output 130, which internal to the mobile device 102. The output 130, and generally an output as described in this specification, may comprise e.g. an electrical connection or a register of image processing subsystem 120.

The spectrum of the ambient illumination may be provided as an explicit output of the image processing subsystem 120 i.e. output 130 may provide data defining a spectrum. Also or instead the image processing subsystem 120 may further process the spectrum of the ambient illumination e.g. to classify the ambient illumination into one of a set of discrete categories, e.g. representing different types of illumination such as one or more of: fluorescent light illumination, LED illumination, tungsten/incandescent illumination, and daylight illumination. The output 130 may then comprise data identifying the category into which ambient illumination is classified.

The image processing subsystem 120 may be implemented in hardware, software (which as used here includes firmware), or a combination of the two. As illustrated in FIG. 1 non-volatile memory 122 stores processor control code to control a processor of the image processing subsystem 120 to perform the operations described later to estimate the spectrum of the ambient illumination, and optionally to perform other tasks such as classifying the ambient illumination, and colour-compensating a captured image.

Figure 2:
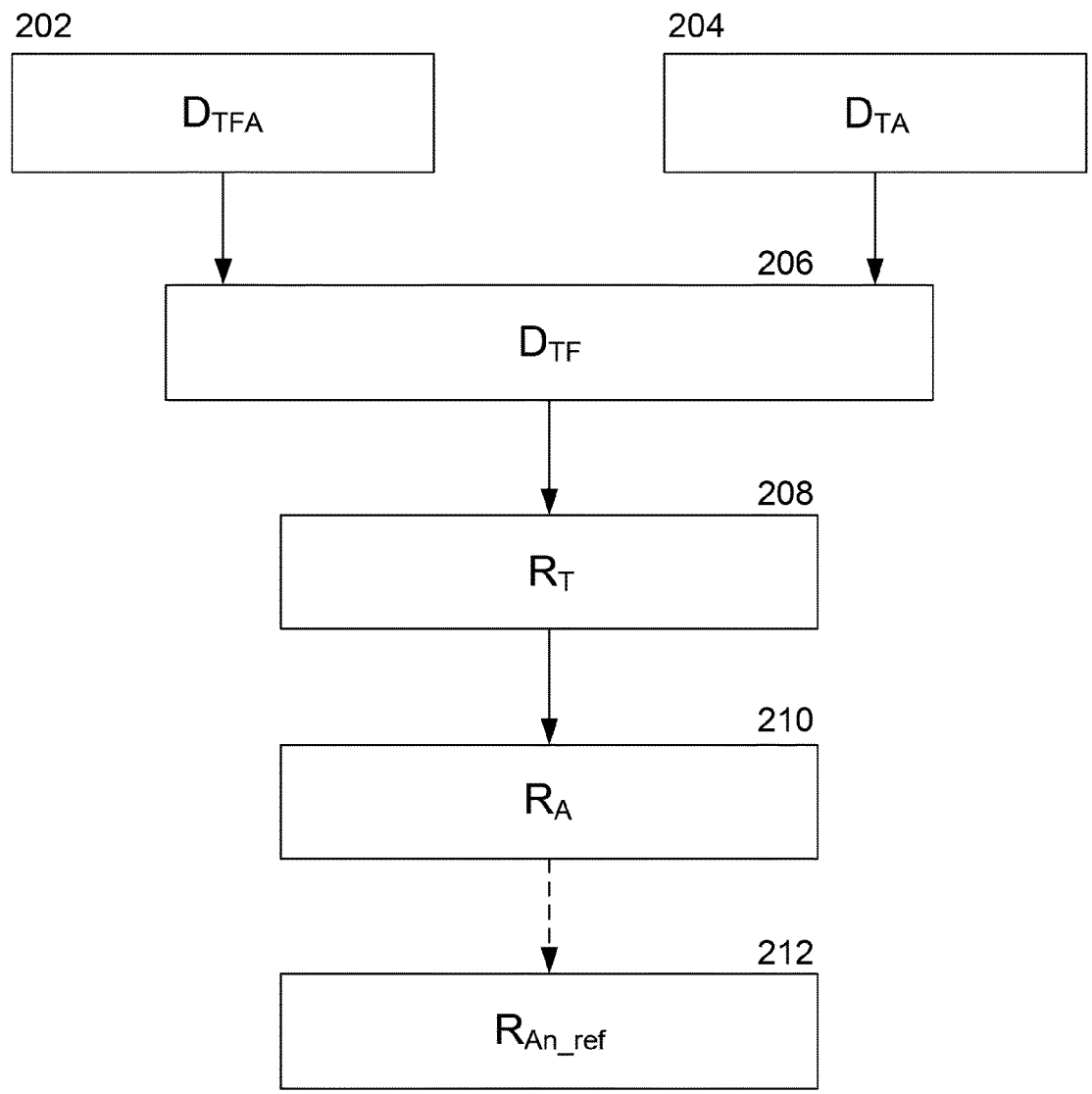
FIG. 2 shows a process for characterizing ambient illumination.

FIG. 2 shows a process for using the camera system 100 of FIG. 1 to determine data defining a spectrum of the ambient illumination. The process begins by capturing two spectra using the multispectral sensor 108, one with and one without the flash illuminating the scene, and these are then processed to determine a spectrum of the ambient illumination.

Thus at step 202 the process controls e.g. triggers the flash to illuminate the scene and captures a first spectrum of light from the scene using the multispectral sensor whilst the flash is operating to illuminate the scene in addition to ambient illumination.

In general the colour of a scene can be described by a product of the reflectance of the scene, i.e. the colour of reflecting surfaces in the scene (the "target colour") and the illumination i.e. the colour of the light illuminating the scene.

The first spectrum may be represented by a first spectrum vector $D_{TFA}$ of dimension n each element of the vector corresponding to a wavelength channel of the n-channel multispectral sensor. Here $D_{TFA}$ denotes the detected multispectral sensor signal. This comprises the scene illumination, a combination of the ambient light illumination of the scene and the flash illumination of the scene, modified (multiplied) by the target colour of the scene, that is multiplied by a reflectance of the scene at each wavelength component of the flash illumination (see later).

At step 204 the process captures a second spectrum of light from the scene using the multispectral sensor, whilst the flash is not operating and the scene is illuminated by just the ambient illumination.

The second spectrum may be represented by a second spectrum vector $D_{TA}$ of dimension n, each element of the vector corresponding to a wavelength channel of the n-channel multispectral sensor. Here $D_{TA}$ denotes the detected multispectral sensor signal, which comprises the ambient light illumination of the scene modified (multiplied) by the target colour of the scene.

Steps 202 and 204 may be performed in any order.

At step 206 the process determines a difference between the first and second spectra. This represents a spectrum of the scene as would be detected by the multispectral sensor when illuminated by the flash without the ambient illumination, here referred to as a scene flash spectrum. The scene flash spectrum may be represented by an n-dimensional scene flash spectrum vector, $D_{TF}$, where:

$$D_{TF} = D_{TFA} - D_{TA}$$

To avoid inaccuracy this difference should not be too small. For example a radiance of the flash may be larger, e.g. at least around 5% larger, than a radiance of the ambient light. Implementations of the technique described herein are particularly suitable for indoor applications.

Knowing the spectrum of the scene when illuminated by the flash i.e. the scene flash spectrum vector, $D_{TF}$, and knowing the spectrum of the flash illumination, the (mean) target colour of the scene may be determined. The target colour is represented by an average reflectance spectrum of the scene when compensated for the spectrum of the flash illumination.

The spectrum of the flash illumination may be represented by an m-dimensional flash illumination vector, $E(\lambda)$, where m represents a number of wavelength points defined by the spectrum, e.g. defining an optical output of the flash at each of m different wavelengths. In the case of an LED flash comprising m LEDs each at a different wavelength, e.g. a white LED flash, the flash illumination vector may define the optical output at each LED wavelength. The optical output may be defined as the radiance at each wavelength, or may be defined in arbitrary units.

Thus at step 208 the process may compensate the scene flash spectrum using the spectrum of the flash illumination to determine a colour-compensated scene flash spectrum.

In general terms, since the scene flash spectrum is a product of the spectrum of the flash illumination and the target colour, the true target colour may be recovered by dividing the scene flash spectrum by the spectrum of the flash illumination. In practice, however, this may involve multiplying the scene flash spectrum vector by a matrix, $M_{TF}$, derived from a combination of a sensitivity matrix, $S(\lambda)$, representing a wavelength-dependent sensitivity of the multispectral sensor 108, and the flash illumination vector.

The true target colour, i.e. the colour-compensated scene flash spectrum, may be represented by an m-dimensional colour-compensated scene flash spectrum vector, $R_T(\lambda)$, which defines a true colour (average reflectance) of the scene at each of the m different wavelengths of the flash illumination vector. Then, for example, $$R_T(\lambda) = M_{TF}^T \cdot D_{TF}$$

where the superscript T denotes a matrix transpose.

In general (though not necessarily) the n wavelength channels of the sensor may not coincide with the m wavelengths of the flash illumination. An n×m sensitivity matrix, $S(\lambda)$, may thus be defined for the multispectral sensor 108. The sensitivity matrix may define the sensitivity of each of the n sensor wavelength channels at each of the m wavelengths representing the spectrum of the flash illumination. The sensitivity matrix may be known for the multispectral sensor 108 or may be determined by calibration.

In some implementations the matrix, $M_{TF}$, represents an inverse of the sensitivity of the multispectral sensor measured at the spectrum of the flash illumination. This may be a pseudo inverse or Wiener inverse of a matrix generated from the n×m sensitivity matrix, $S(\lambda)$, and m-dimensional flash illumination vector, $E(\lambda)$. The matrix generated from $S(\lambda)$ and $E(\lambda)$, which may be termed $S_{TF}$, may be generated by elementwise multiplication of each m-dimensional column of $S(\lambda)$ by $E(\lambda)$. For example the ith column of $S_{TF}$ may have elements $S_{i,1} \cdot E_1, \ldots, S_{i,m} \cdot E_m$, where i=1 … n.

Alternatively the matrix $M_{TF}$ may be determined by calibration, e.g. by illuminating a scene e.g. a white wall, at each separate wavelength m under zero ambient light.

The matrix, $M_{TF}$, may be determined as a pseudo inverse by determining:

$$M_{TF} = S_{TF}^T * (S_{TF} * S_{TF}^T)^{-1}$$

The matrix, $M_{TF}$, may be determined as a Wiener inverse by determining:

$$M_{TF} = S_{TF}^T * \text{Smooth} * (S_{TF} * \text{Smooth} * S_{TF}^T)^{-1}$$

where Smooth is a smoothing matrix, for example:

$$\text{Smooth} = \begin{bmatrix} 1 & \rho & \rho^2 & & \rho^{m-1} \\ \rho & 1 & \rho & \cdots & \rho^{m-2} \\ \rho^2 & \rho & 1 & & \vdots \\ \vdots & & & \cdots & \rho \\ \rho^{m-1} & \rho^{m-2} & \cdots & \rho & 1 \end{bmatrix}$$

$$\rho \sim [0.9 \ldots 0.999]$$

Determining $M_{TF}$ as a Wiener inverse is more representative than determining $M_{TF}$ as a pseudo-inverse. Other methods may also be used to determine $M_{TF}$.

The process may then use the true target colour, i.e. the colour-compensated scene flash spectrum vector, $R_T(\lambda)$, to estimate a spectrum of the ambient illumination (step 210). This may use the second spectrum, obtained when the scene is illuminated by just ambient illumination, as represented by the second spectrum vector $D_{TA}$.

In an example implementation a second matrix, $M_{TA}$, represents an inverse of the sensor sensitivity. In this case $M_{TA}$, may be determined as a pseudo inverse or Wiener inverse of the n×m sensitivity matrix $S(\lambda)$ characterizing the spectral sensitivity of the multispectral sensor 108.

Thus an m-dimensional sensor-compensated second spectrum vector, $R_{TA}(\lambda)$, may be determined as:

$$R_{TA}(\lambda) = M_{TA}^T \cdot D_{TA}$$

where again the superscript T denotes a matrix transpose. Here $R_{TA}(\lambda)$, represents a measurement of the second (ambient light only) spectrum compensated for the response of the multispectral sensor 108.

The spectrum of the ambient illumination may be represented by an m-dimensional vector $R_A(\lambda)$ with a value for each of m wavelengths. This may be determined by element-wise dividing the sensor-compensated second spectrum vector $R_{TA}(\lambda)$ by the colour-compensated scene flash spectrum vector $R_T(\lambda)$:

$$R_A(\lambda) = \frac{R_{TA}(\lambda)}{R_T(\lambda)}$$

The process may provide the spectrum of the ambient illumination as an output and/or the process may then classify the type (category) of ambient illumination (step 214). There are many ways in which this might be done, for example determining which of a set of template or reference spectra best matches the measured spectrum. The classification may simply aim to distinguish between natural and artificial illumination or may also attempt to determine a particular type (category) of artificial illumination.

An advantage of classifying the ambient illumination is that this may allow a more accurate determination of the ambient light spectrum: a relatively few points may serve to classify the ambient light spectrum but once the type of ambient illumination is known better colour compensation may be applied.

As an example, in one approach to classifying the type of ambient illumination the measured spectrum of the ambient illumination is first normalized, e.g.

$$R_{An}(\lambda) = R_A(\lambda)/R_A(\text{mean})$$

where $R_A$ (mean) is the mean of the elements of $R_A(\lambda)$. A set of i reference spectra may be represented as an i×m matrix, $R_{Aref}(\lambda, i)$, where i indexes a reference spectrum and m indexes wavelength. These may be normalized in the same way to determine a set of normalized reference spectra, $R_{An\_ref}(\lambda, i)$:

$$R_{An\_ref}(\lambda, i) = R_{Aref}(\lambda, i)/R_{Aref}(\text{mean}, i)$$

where $R_{Aref}$(mean, i) is the mean of the elements of $R_{Aref}(\lambda, i)$ for reference spectrum i. The set of reference spectra may be stored in non-volatile memory 122.

An integrated deviation, d(i), between the measured spectrum of the ambient illumination and each of the reference spectra may then be determined, e.g.

$$d(i) = \text{sum}(\text{abs}(R_{An}(\lambda) - R_{An\_ref}(\lambda, i)))$$

where abs(·) denotes taking an absolute value and sum(·) denotes summing over $\lambda$. The type of ambient illumination may then be determined by determining the best match to the reference spectra, i.e. $\arg\min_i d(i)$, the value of i which minimises d(i).

Also or instead the measured spectrum of the ambient illumination may be processed to determine a location of the ambient illumination in a colour space (on a chromaticity diagram), such as a location in CIE u', v' colour space.

Also or instead the measured spectrum of the ambient illumination may be processed to determine colour temperature, e.g. correlated colour temperature, CCT, of the ambient illumination.

This information may be provided as an illumination data output from the system.

The illumination data may be stored with image data from the image sensor, and/or used to colour-correct a captured image, or used in some other way. For example an image captured under low-CCT ambient light may be processed so as to appear captured under other, e.g. standard, illumination such as D65 daylight.

Also or instead data characterizing the true target colour, i.e. independent of the ambient light, may be provided as a data output from the system. For example the system may output the colour-compensated scene flash spectrum vector, $R_T(\lambda)$. This may be used, for example, to determine the true colour of a target such as paint on a wall, to overcome metamerism when colour matching.

Figure 3A:
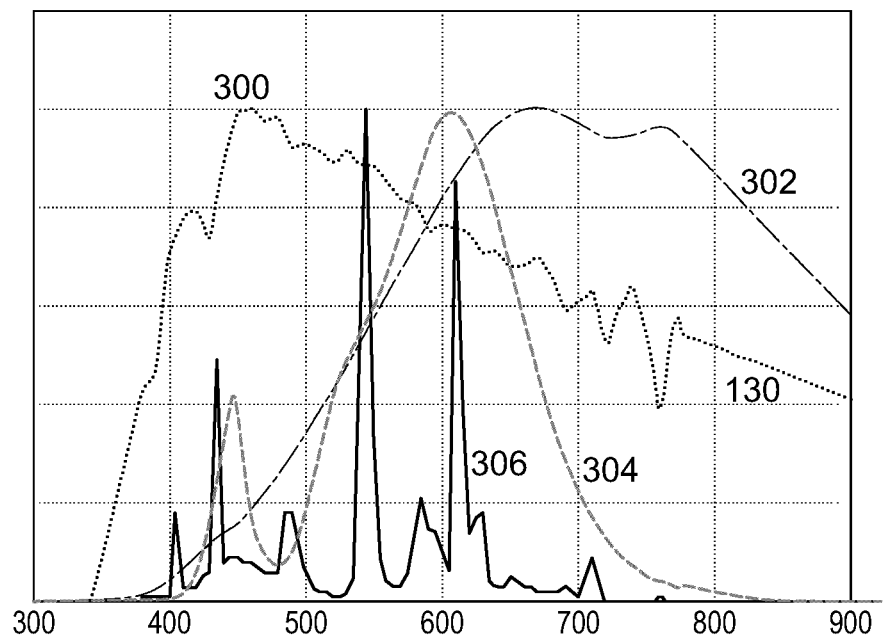
FIGS. 3a-d show example ambient light spectra and their effect on the spectra of a colour.
Figure 3B:
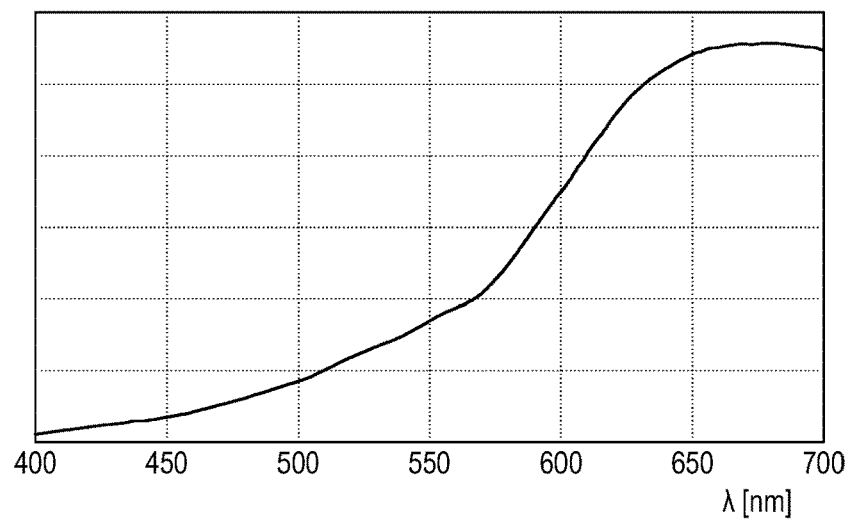
Figure 3C:
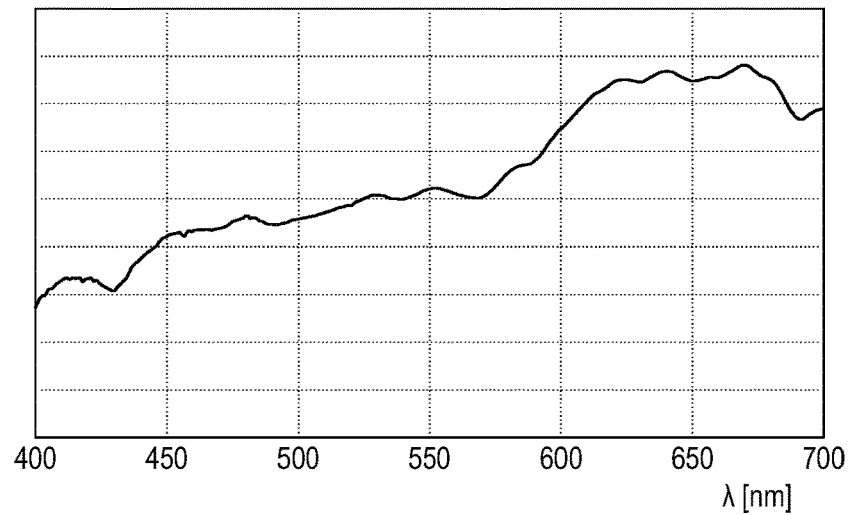
Figure 3D:
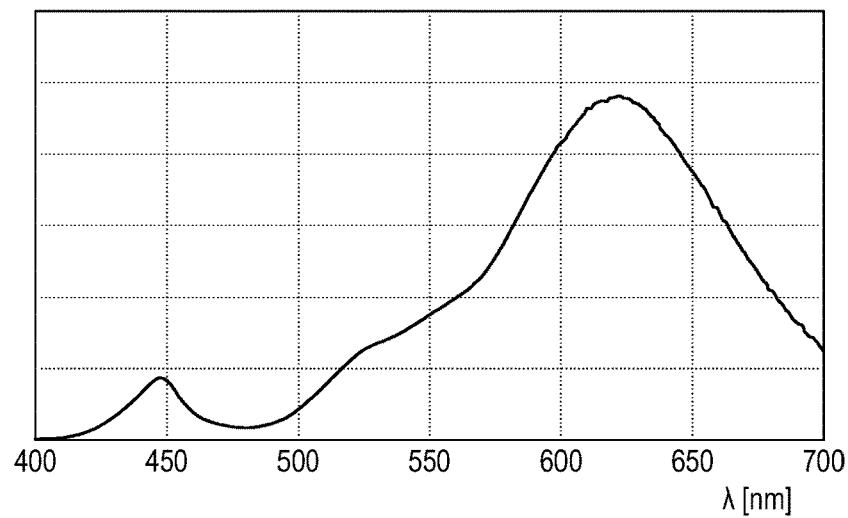

FIG. 3a shows example ambient light spectra for D65 daylight 300, a low CCT halogen lamp 302, a white LED 304, and a fluorescent light 306; wavelength in nm is on the x-axis. FIGS. 3b-d show spectra for the same "light skin" colour under, respectively, halogen, D65, and LED illumination. The colour appears more reddish under halogen illumination. Additional effects arise from the RGB filter characteristic of the camera.

The CIE 1931 and CIE 1964 colour spaces are designed to better match human vision and have associated colour matching functions. These can be thought of as defining the sensitivity curves of three light detectors for CIE tristimulus values XYZ, approximately blue, green and red. A 3×3 matrix defines a conversion from RBG to XYZ for a particular image sensor. As described above, for implementations of the system described herein this may also take account of the spectrum of the ambient illumination (which may be treated as a modification to the RGB sensor characteristic).

Figure 4A:
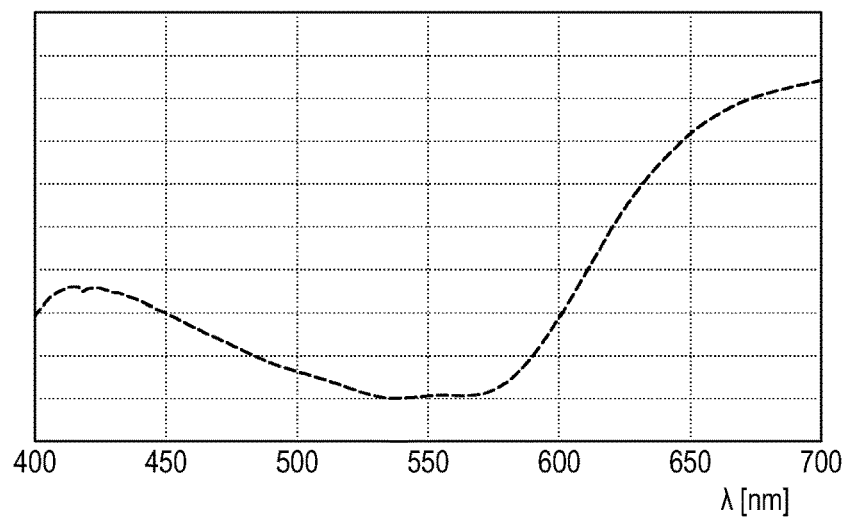
FIGS. 4a-i illustrate of steps in determining an ambient light spectrum.
Figure 4B:
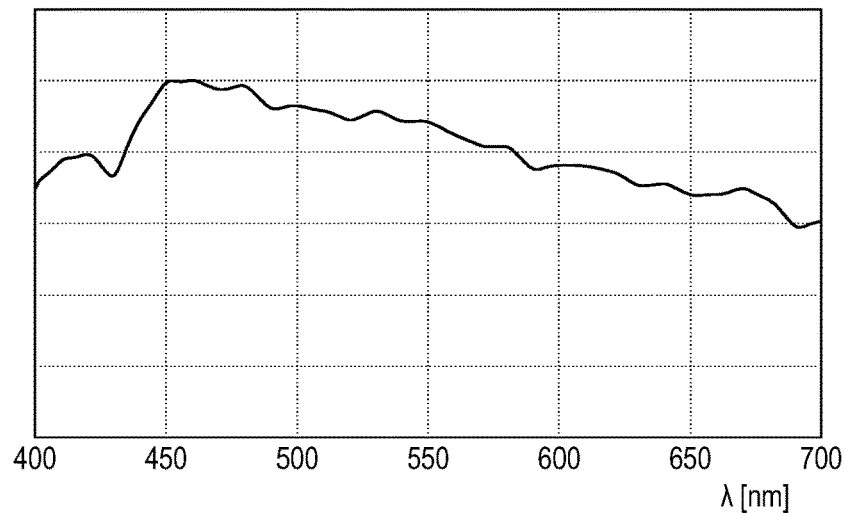
Figure 4C:
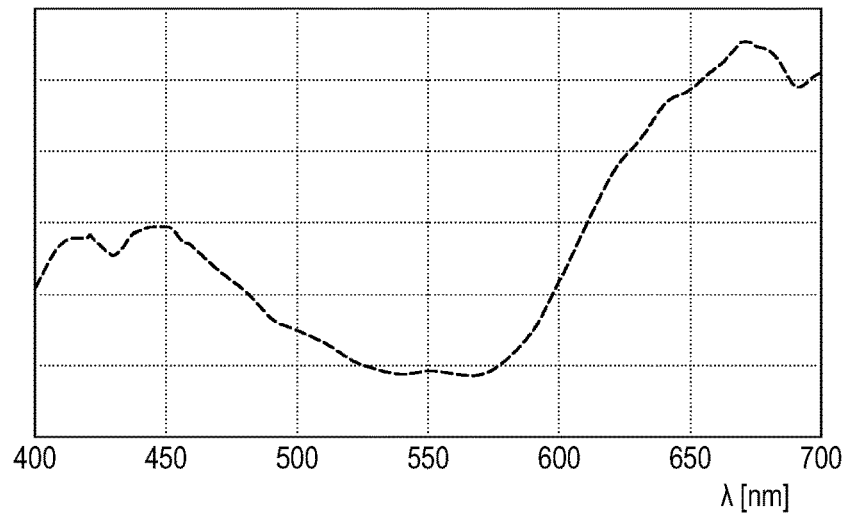
Figure 4D:
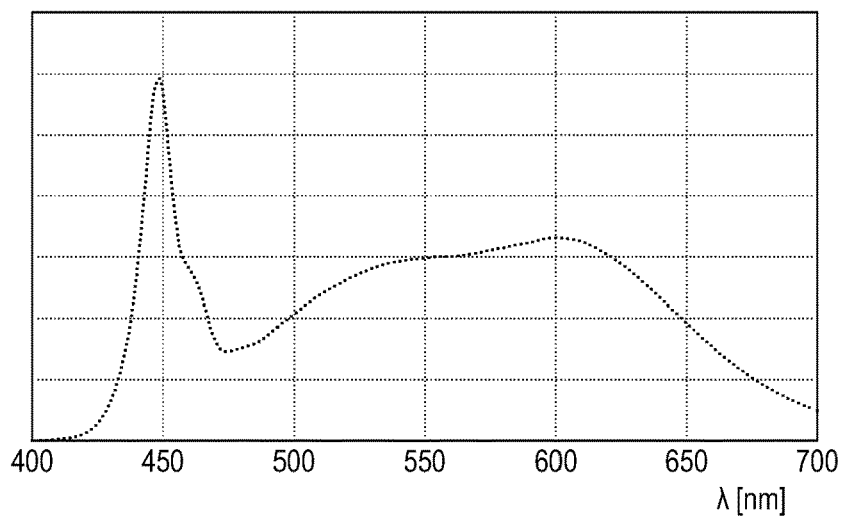
Figure 4E:
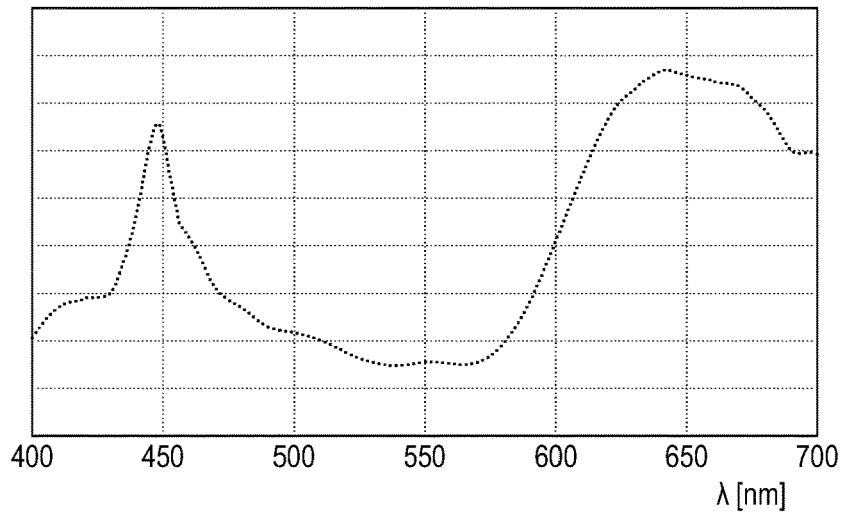
Figure 4F:
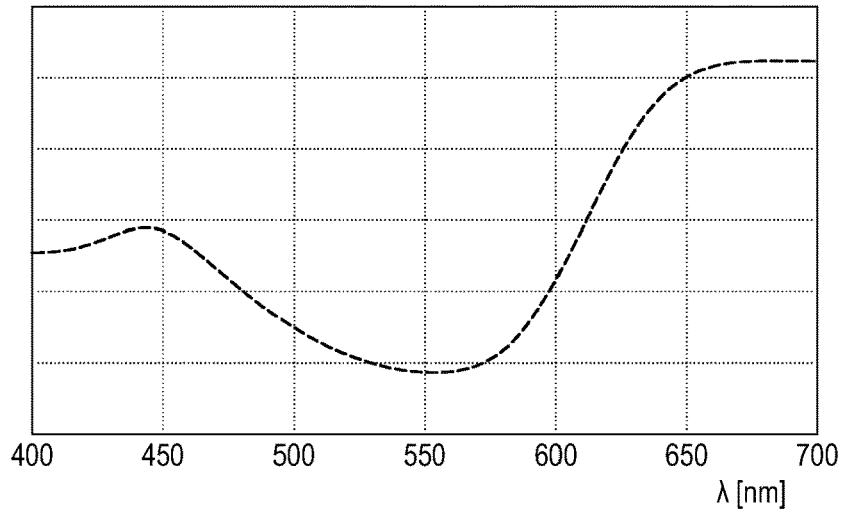
Figure 4G:
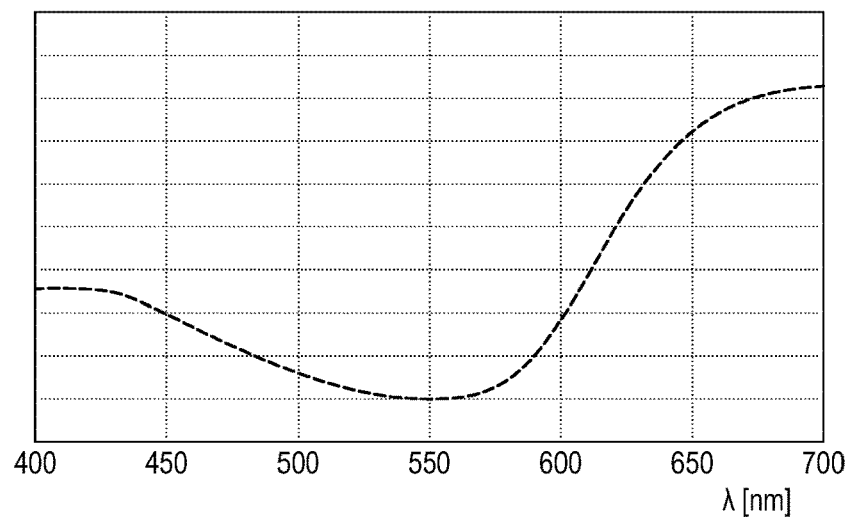
Figure 4H:
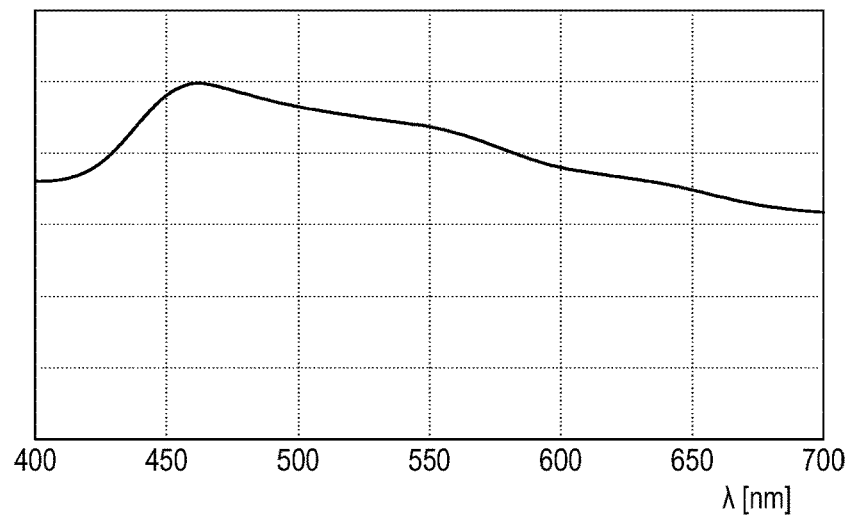
Figure 4I:
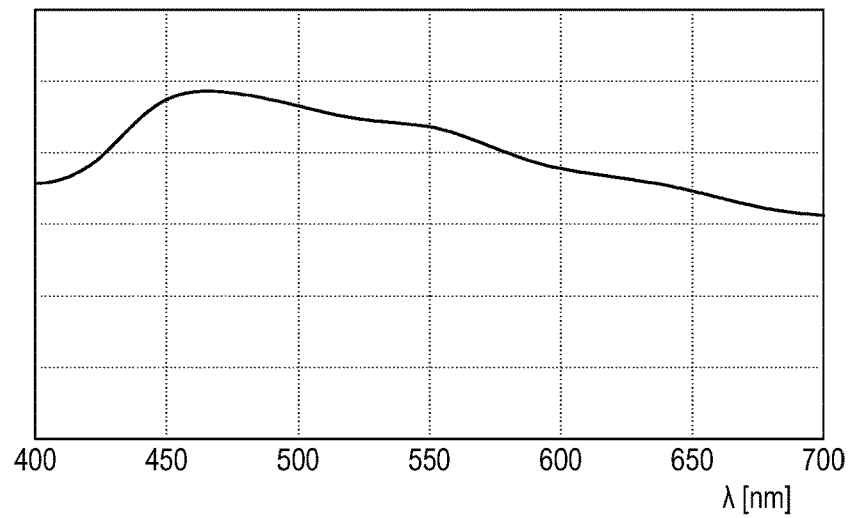

FIGS. 4a-g show an example illustration of steps in determining an ambient light spectrum and reconstructing the true (average) colour of a scene using the above described method. FIG. 4a shows the spectrum of a target colour (magenta), FIG. 4b an ambient D65 daylight spectrum, FIG. 4c a detected spectrum of the target colour under the D65 illumination ($D_{TA}$), FIG. 4d a white LED flash spectrum, and FIG. 4e a detected spectrum of the target colour under the flash and D65 ambient illumination ($D_{TFA}$). The example calculates $D_{TF} = D_{TFA} - D_{TA}$ and then determines the sensor-compensated spectrum of the target colour under ambient light, $R_{TA}(\lambda)$, shown in FIG. 4f. FIG. 4g shows the reconstructed spectrum of the target colour, $R_T(\lambda)$, i.e. the true colour—it can be seen that FIG. 4g is very similar to FIG. 4a. The reconstructed ambient light spectrum $$R_A(\lambda) = \frac{R_{TA}(\lambda)}{R_T(\lambda)}$$

is shown in FIG. 4h; for comparison a direct measurement of the D65 spectrum of FIG. 4a by the same multispectral sensor 108 is shown in FIG. 4i. It can be seen that the technique is very accurate.

In broad terms there has been described a method of calculating a spectrum of ambient light by measuring an image scene with and without flash light. The method comprises reconstructing a mean reflectance colour of the scene under ambient light (A) by using a first matrix operation (optimized for direct measurement); reconstructing the mean reflectance colour of the scene (B) by using a second matrix operation (optimized for colour measurement and with respect to the known spectrum of a flash light); and calculating the ambient light spectrum as difference between A and B.

The type of ambient light source may be detected by comparison with a set of expected reconstructed data for typical light sources, for example by calculating the spectral deviation and finding the reference light source spectrum with lowest deviation, e.g. using a least squares method, or a sum of absolute differences between the spectra over the spectra.

The method may be used for ambient white balancing in a camera, and/or for generating specific conversion matrices from e.g. RGB values of a (sensor) pixel to a standard colour space (e.g. XYZ), and/or to provide additional image information for post image capture processing.

LIST OF REFERENCE NUMERALS 100 camera system
102 mobile device
104 display
106 image sensor
108 multispectral sensor
110 flash
120 image processing subsystem
122 non-volatile memory
124 multispectral data capture line
126 flash control line
128 image capture line
130 output
202 control flash to illuminate scene and capture first spectrum
204 capture second spectrum from the scene under ambient illumination
206 determine a difference between the first and second spectra, $D_{TF}$
208 colour-compensate to determine true mean colour of the scene, $R_T(\lambda)$
210 use true colour to estimate spectrum of ambient illumination, $R_A(\lambda)$
212 classify the type of ambient illumination
300 D65 daylight spectrum
302 low CCT halogen lamp spectrum
304 white LED spectrum
306 fluorescent light spectrum Features of the method and system which have been described or depicted herein in combination e.g. in an embodiment, may be implemented separately or in sub-combinations. Features from different embodiments may be combined. Thus each feature disclosed or illustrated in the present specification may be incorporated in the invention, whether alone or in any appropriate combination with any other feature disclosed or illustrated herein. Method steps should not be taken as requiring a particular order e.g. that in which they are described or depicted, unless this is specifically stated. A system may be configured to perform a task by providing processor control code and/or dedicated or programmed hardware e.g. electronic circuitry to implement the task.

Aspects of the method and system have been described in terms of embodiments but these embodiments are illustrative only and that the claims are not limited to those embodiments.

For example, the system may be used in an electronic device such as a projector, laptop, or smart home device such as a smart speaker, in which case the imaging sensor may be omitted. In such applications the system may still be termed a camera system as it includes a light sensor, i.e. the multispectral sensor, though not necessarily an imaging sensor. In such applications the system may be used e.g. to colour-correct a displayed image.

Those skilled in the art will be able to make modifications and alternatives in view of the disclosure which are contemplated as falling within the scope of the claims.

The invention claimed is:

1. A method of using a camera system to characterize ambient illumination, the camera system having an image sensor to capture a view of a scene, a flash to provide flash illumination of the scene, and a multispectral sensor to capture a spectrum of light from the scene in a plurality of wavelength channels, the method comprising:

capturing a first spectrum of light ($D_{TFA}$) from the scene using the multispectral sensor whilst the flash is operating to illuminate the scene in addition to ambient illumination;

capturing a second spectrum of light ($D_{TA}$) from the scene using the multispectral sensor whilst the flash is not operating and the scene is illuminated by the ambient illumination;

determining a difference between the first and second spectra representing a scene flash spectrum ($D_{TF}$), wherein the scene flash spectrum represents a spectrum of the scene when illuminated by the flash without the ambient illumination;

compensating the scene flash spectrum using a spectrum of the flash illumination ($E(\lambda)$) to determine a colour-compensated scene flash spectrum ($R_T(\lambda)$), wherein the colour-compensated scene flash spectrum represents an average reflectance spectrum of the scene when compensated for the spectrum of the flash illumination; and processing the second spectrum of light from the scene using the colour-compensated scene flash spectrum to estimate a spectrum of the ambient illumination ($R_A(\lambda)$);

wherein processing the second spectrum of light from the scene using the colour-compensated scene flash spectrum to estimate a spectrum of the ambient illumination comprises dividing a representation of the second spectrum of light ($R_{TA}(\lambda)$) by the colour-compensated scene flash spectrum ($R_T(\lambda)$).

2. The method as claimed in claim 1 further comprising compensating each of the first and second spectra for a response of the multispectral sensor ($M_{TF}$; $M_{TA}$).

3. The method as claimed in claim 1 wherein the multispectral senor has n wavelength channels, wherein the first and second spectra are represented by respective first spectrum and second spectrum vectors of length n ($D_{TFA}$; $D_{TA}$), and wherein determining the difference between the first and second spectra comprises subtracting one of the first spectrum and second spectrum vectors from the other to determine a scene flash spectrum vector ($D_{TF}$).

4. The method as claimed in claim 3 wherein the spectrum of the flash illumination is represented by a flash illumination vector ($E(\lambda)$) of length m, where m represents a number of wavelength points defined by the spectrum; wherein a sensitivity of the multispectral sensor at the wavelength points for each wavelength channel is defined by a n×m sensitivity matrix ($S(\lambda)$); and wherein compensating the scene flash spectrum using the spectrum of the flash illumination comprises multiplying the scene flash spectrum vector ($D_{TF}$) by a matrix ($M_{TF}$) defined by a combination of the sensitivity matrix and the flash illumination vector to obtain a colour-compensated scene flash spectrum vector ($R_T(\lambda)$) representing the colour-compensated scene flash spectrum.

5. The method as claimed in claim 4 further comprising multiplying the second spectrum vector ($D_{TA}$) by an inverse of the sensitivity matrix ($M_{TA}$) to obtain a sensor-compensated second spectrum vector ($R_{TA}(\lambda)$), and dividing sensor-compensated second spectrum vector by the colour-compensated scene flash spectrum vector ($R_T(\lambda)$).

6. The method as claimed in claim 1 wherein the multispectral sensor has at least four wavelength channels.

7. The method as claimed in claim 1 further comprising adapting an RGB to CIE XYZ transformation matrix of the camera using the estimated spectrum of the ambient illumination.

8. The method as claimed in claim 1 further comprising using the image sensor to capture an image, and i) using the estimated spectrum of the ambient illumination to colour-correct the image and/or ii) storing data representing the estimated spectrum of the ambient illumination with image data representing the captured image.

9. The method as claimed in claim 1 further comprising processing the estimated spectrum of the ambient illumination to classify the ambient illumination into one of a set of discrete categories, and controlling one or both of image capture and image processing by the camera dependent upon the category of the ambient illumination.

10. The method as claimed in claim 1 further comprising processing the estimated spectrum of the ambient illumination to determine illumination data characterizing a colour or colour temperature of the ambient illumination, and i) using the illumination data to colour-correct the image and/or ii) storing the illumination data with image data from the image sensor.

11. The method as claimed in claim 1 further comprising determining a colour transformation matrix, wherein the colour transformation matrix comprises a matrix to transform from an RGB to a CIE XYZ colour space adapted to compensate for the estimated spectrum of the ambient illumination.

12. Processor control code, or one or more computer readable media storing processor control code, to implement the method of claim 1.

13. A camera system (100) comprising:
an image sensor (106) to capture a view of a scene;
a flash (110) to provide flash illumination of the scene;
a multispectral sensor (108) to capture a spectrum of light from the scene in a plurality of wavelength channels;
an image processing subsystem (120) configured to:
capture a first spectrum of light ($D_{TFA}$) from the scene using the multispectral sensor whilst the flash is operating to illuminate the scene in addition to ambient illumination;
capture a second spectrum of light ($D_{TA}$) from the scene using the multispectral sensor whilst the flash is not operating and the scene is illuminated by the ambient illumination;
determine a difference between the first and second spectra representing a scene flash spectrum ($D_{TF}$), wherein the scene flash spectrum represents a spectrum of the scene when illuminated by the flash without the ambient illumination;
compensate the scene flash spectrum using a spectrum of the flash illumination ($E(\lambda)$) to determine a colour-compensated scene flash spectrum ($R_T(\lambda)$), wherein the colour-compensated scene flash spectrum represents an average reflectance spectrum of the scene when compensated for the spectrum of the flash illumination; and
process the second spectrum of light from the scene using the colour-compensated scene flash spectrum to estimate a spectrum of the ambient illumination ($R_A(\lambda)$);
wherein processing the second spectrum of light from the scene using the colour-compensated scene flash spectrum comprises dividing each of a set of values ($R_{TA}(\lambda)$) representing the second spectrum of light at each of a respective set of wavelength points by a corresponding value for the colour-compensated scene flash spectrum ($R_T(\lambda)$) at the respective wavelength point.

14. A method of using a camera system to characterize ambient illumination, the camera system having an image sensor to capture a view of a scene, a flash to provide flash illumination of the scene, and a multispectral sensor to capture a spectrum of light from the scene in a plurality of wavelength channels, the method comprising:
capturing a first spectrum of light ($D_{TFA}$) from the scene using the multispectral sensor whilst the flash is operating to illuminate the scene in addition to ambient illumination;
capturing a second spectrum of light ($D_{TA}$) from the scene using the multispectral sensor whilst the flash is not operating and the scene is illuminated by the ambient illumination;
determining a difference between the first and second spectra representing a scene flash spectrum ($D_{TF}$), wherein the scene flash spectrum represents a spectrum of the scene when illuminated by the flash without the ambient illumination;
compensating the scene flash spectrum using a spectrum of the flash illumination ($E(\lambda)$) to determine a colour-compensated scene flash spectrum ($R_T(\lambda)$), wherein the colour-compensated scene flash spectrum represents an average reflectance spectrum of the scene when compensated for the spectrum of the flash illumination; and
processing the second spectrum of light from the scene using the colour-compensated scene flash spectrum to estimate a spectrum of the ambient illumination ($R_A(\lambda)$);
wherein processing the second spectrum of light from the scene using the colour-compensated scene flash spectrum comprises dividing each of a set of values ($R_{TA}(\lambda)$) representing the second spectrum of light at each of a respective set of wavelength points by a corresponding value for the colour-compensated scene flash spectrum ($R_T(\lambda)$) at the respective wavelength point.

15. The method as claimed in claim 14 wherein the multispectral senor has n wavelength channels, wherein the first and second spectra are represented by respective first spectrum and second spectrum vectors of length n ($D_{TFA}$; $D_{TA}$), and wherein determining the difference between the first and second spectra comprises subtracting one of the first spectrum and second spectrum vectors from the other to determine a scene flash spectrum vector ($D_{TF}$).

16. The method as claimed in claim 15 wherein the spectrum of the flash illumination is represented by a flash illumination vector ($E(\lambda)$) of length m, where m represents a number of wavelength points defined by the spectrum;

wherein a sensitivity of the multispectral sensor at the wavelength points for each wavelength channel is defined by a n×m sensitivity matrix ($S(\lambda)$); and wherein compensating the scene flash spectrum using the spectrum of the flash illumination comprises multiplying the scene flash spectrum vector ($D_{TF}$) by a matrix ($M_{TF}$) defined by a combination of the sensitivity matrix and the flash illumination vector to obtain a colour-compensated scene flash spectrum vector ($R_T(\lambda)$) representing the colour-compensated scene flash spectrum.

17. The method as claimed in claim 16 further comprising multiplying the second spectrum vector ($D_{TA}$) by an inverse of the sensitivity matrix ($M_{TA}$) to obtain a sensor-compensated second spectrum vector ($R_{TA}(\lambda)$), and dividing sensor-compensated second spectrum vector by the colour-compensated scene flash spectrum vector ($R_T(\lambda)$).

* * * * *